US010721306B2

(12) United States Patent
McClelland et al.

(10) Patent No.: US 10,721,306 B2
(45) Date of Patent: Jul. 21, 2020

(54) SYSTEM AND METHOD FOR COORDINATING AGRICULTURAL VEHICLE COMMUNICATION

(71) Applicant: CNH Industrial America LLC, New Holland, PA (US)

(72) Inventors: Brett Carson McClelland, Chicago, IL (US); Yaseen Suleman, Glendale Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/905,466

(22) Filed: Feb. 26, 2018

(65) Prior Publication Data

US 2019/0268417 A1     Aug. 29, 2019

(51) Int. Cl.
| | |
|---|---|
| *H04L 29/08* | (2006.01) |
| *H04W 4/02* | (2018.01) |
| *G08C 17/02* | (2006.01) |
| *H04W 4/08* | (2009.01) |
| *H04W 4/46* | (2018.01) |

(Continued)

(52) U.S. Cl.
CPC .............. *H04L 67/12* (2013.01); *G08C 17/02* (2013.01); *G08G 1/20* (2013.01); *H04L 41/22* (2013.01); *H04W 4/023* (2013.01); *H04W 4/08* (2013.01); *H04W 4/46* (2018.02); *G05D 1/0291* (2013.01);

(Continued)

(58) Field of Classification Search
CPC ..... A01B 79/005; A01B 69/008; A01B 69/00; H04W 4/70; H04W 4/02; H04W 4/023; H04W 4/08; H04W 4/80; H04W 84/18
See application file for complete search history.

(56) References Cited

U.S. PATENT DOCUMENTS

| | | |
|---|---|---|
| 5,809,440 A | 9/1998 | Beck et al. |
| 6,898,493 B2 | 5/2005 | Ehrman et al. |

(Continued)

OTHER PUBLICATIONS

Case IH; "Case IH Premieres Concept Vehicle at Farm Progress Show"; Aug. 31, 2016; https://www.caseih.com/apacf/en-in/News/Pages/2016-case-ih-premieres-vehicle-at-farm-progress-show.aspx (3 pages).

(Continued)

*Primary Examiner* — Liton Miah (74) *Attorney, Agent, or Firm* — Rickard K. DeMille; Rebecca L. Henkel (57) ABSTRACT

A control system for a first agricultural vehicle includes a first transceiver that communicatively couples to a second transceiver of a second agricultural vehicle via a communication network. The control system further includes a first controller communicatively coupled to the first transceiver, such that the first controller includes a processor and a memory device storing instructions thereon that when executed cause the processor to establish a first team that is accessible by the second agricultural vehicle, cause the second agricultural vehicle to join the first team upon receipt of a first signal from the second agricultural vehicle, such that the first signal is indicative of login credentials, and enable communication between the first agricultural vehicle and the second agricultural vehicle via the communication network to facilitate coordination between the first and second agricultural vehicles.

20 Claims, 5 Drawing Sheets

(51) Int. Cl.
*G08G 1/00* (2006.01)
*H04L 12/24* (2006.01)
*G05D 1/02* (2020.01)

(52) U.S. Cl.
CPC . *G05D 2201/0201* (2013.01); *G08C 2201/30* (2013.01)

(56) References Cited

U.S. PATENT DOCUMENTS

| | | |
|---|---|---|
| 7,451,023 B2 | 11/2008 | Appleby et al. |
| 7,539,557 B2 | 5/2009 | Yamauchi |
| 8,437,901 B2 | 5/2013 | Anderson |
| 8,639,408 B2 | 1/2014 | Anderson |
| 8,818,567 B2 | 8/2014 | Anderson |
| 8,838,302 B2 | 9/2014 | Kumar et al. |
| 9,043,131 B2 | 5/2015 | Carlson et al. |
| 9,265,187 B2 | 2/2016 | Cavender-Bares et al. |
| 9,606,535 B2 | 3/2017 | Humenay |
| 2006/0271262 A1 | 11/2006 | McLain, III |
| 2007/0129869 A1 | 6/2007 | Gudat et al. |
| 2009/0312919 A1* | 12/2009 | Foster ............... A01B 79/005 701/50 |
| 2010/0042297 A1* | 2/2010 | Foster ............... H04W 4/70 701/50 |
| 2011/0225269 A1 | 9/2011 | Yap et al. |
| 2013/0332021 A1 | 12/2013 | Goren |
| 2016/0278277 A1* | 9/2016 | Vålberg ............. A01C 21/005 |
| 2017/0038217 A1 | 2/2017 | Chambers et al. |
| 2017/0055432 A1 | 3/2017 | Graham et al. |

OTHER PUBLICATIONS

SAE; "Autonomous heavy equipment positioned to be next disruptive technology"; May 6, 2013; http://articles.sae.org/12084/ (3 pages).

John Deere; "Interview: How John Deere uses connectivity to make farms more efficient"; Mar. 27, 2017; http://www.computerweekly.com/feature/Interview-How-John-Deere-uses-connectivity-to-make-farms-more-efficient (6 pages).

Jama; "What Precision Farming Means to the Future of Agriculture"; Mar. 1, 2017; https://www.jamasoftware.com/blog/what-precision-farming-means-to-the-future-of-agriculture/ (6 pages).

* cited by examiner

FIG. 6

SYSTEM AND METHOD FOR COORDINATING AGRICULTURAL VEHICLE COMMUNICATION

BACKGROUND

The subject matter disclosed herein relates generally to systems and methods for coordinated communication between agricultural vehicles.

Agricultural vehicles (e.g., work vehicles) may perform certain agricultural operations individually or in teams. For example, a single agricultural vehicle may perform any number of operations (e.g., towing a seeder or planter, harvesting crops, tilling land, etc.). Alternatively, one or more agricultural vehicles may coordinate operations between one another to facilitate completing tasks (e.g., tilling a field, harvesting crops, excavating the ground, etc.). Furthermore, the agricultural vehicles operating individually or as a team may be autonomous (e.g., partially or fully) or controlled by an operator (e.g., a driver). In some instances, it may be advantageous for the agricultural vehicles to operate as a team because the vehicles may accomplish a task more quickly and efficiently. However, establishing and coordinating suitable communication in a field between the agricultural vehicles may be difficult thereby reducing the efficiency of agricultural operations performed by the team.

BRIEF DESCRIPTION

In one embodiment, a control system for a first agricultural vehicle includes a first transceiver that communicatively couples to a second transceiver of a second agricultural vehicle via a communication network. The control system further includes a first controller communicatively coupled to the first transceiver, such that the first controller includes a processor and a memory device storing instructions thereon that when executed cause the processor to establish a first team that is accessible by the second agricultural vehicle, cause the second agricultural vehicle to join the first team upon receipt of a first signal from the first agricultural vehicle, such that the first signal is indicative of login credentials, and enable communication between the first agricultural vehicle and the second agricultural vehicle via the communication network to facilitate coordination between the first and second agricultural vehicles.

In another embodiment, a method to enable communication between a plurality of agricultural vehicles, includes establishing, via a processor of a first agricultural vehicle of the plurality of agricultural vehicles, a first team on a wireless communication network, such that the first team is accessible by a second agricultural vehicle or any vehicle of the plurality of vehicles. Furthermore, the method includes causing, via the processor, the second agricultural vehicle or any vehicle of the plurality of agricultural vehicles to join the first team upon receiving a first signal from the second agricultural vehicle, such that the first signal is indicative of login credentials. The method further includes enabling, via the processor, communication between a portion of the plurality of agricultural vehicles in the first team via the wireless communication network to facilitate coordination between the subset of the plurality of agricultural vehicles in the first team.

In a further embodiment, a control system for an agricultural vehicle includes a user interface that includes a display, such that the user interface selectively outputs a first signal indicative of joining an existing team on a wireless communication network and outputs a second signal indicative of creating a new team on the wireless communication network. The control system also includes a controller communicatively coupled to the user interface. The controller includes a memory device and a processor. The processor executes instructions stored in the memory device, such that the instructions when executed by the processor cause the processor to cause the agricultural vehicle to join the existing team on the wireless communication network in response to receiving the first signal, create the new team on the wireless communication network in response to receiving the second signal, or any combination thereof.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
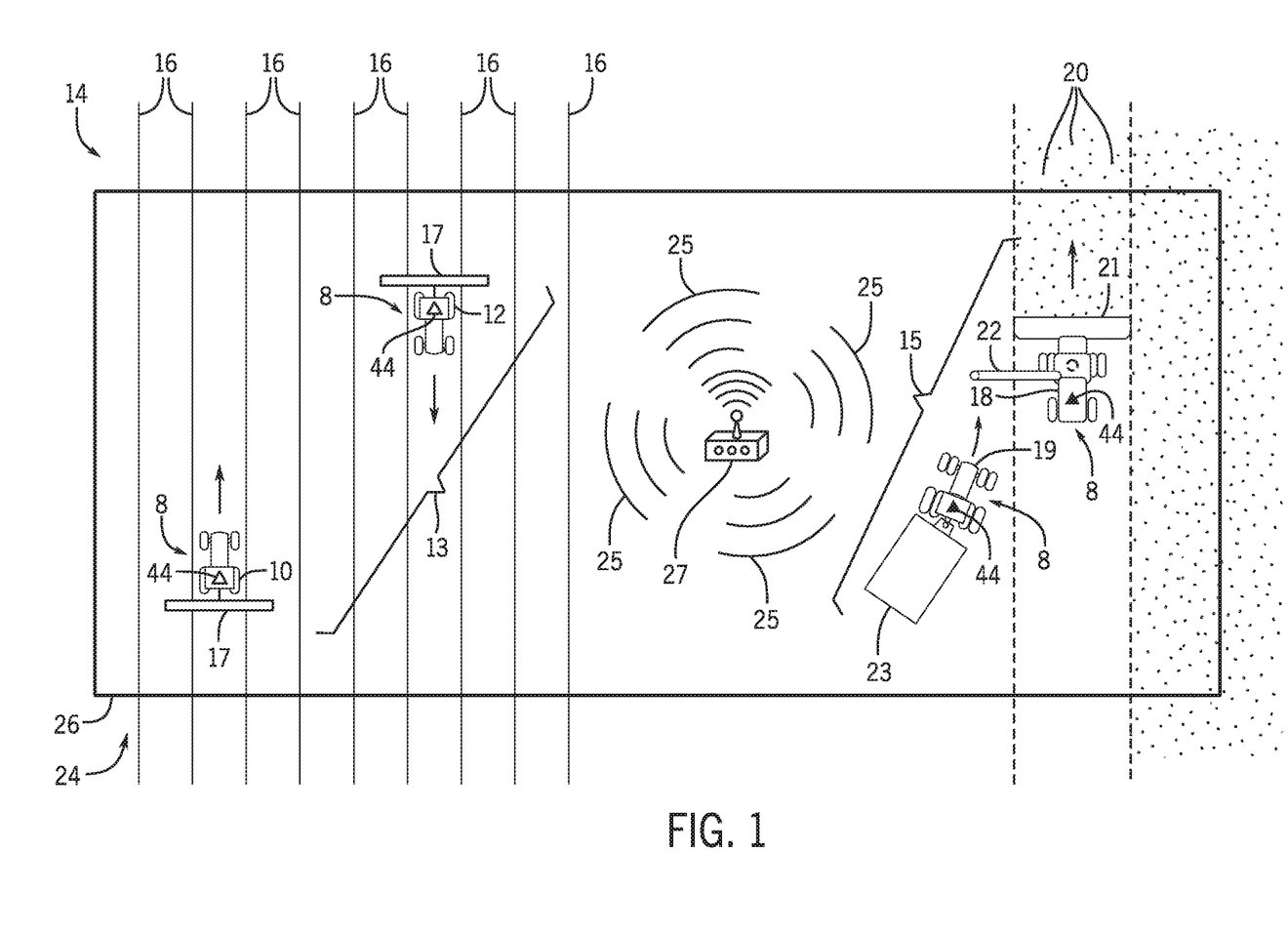
FIG. 1 is a schematic view of an embodiment of various agricultural vehicles communicatively coupled to one another via a network using a communication protocol.

FIG. 1 is a schematic view of an embodiment of various agricultural vehicles 8 communicatively coupled to one another via a network using a communication protocol. In the illustrated embodiment, a first agricultural vehicle 10 and a second agricultural vehicle 12 are configured to operate in a field 14, for example, to accomplish a first task, such as tilling rows 16 of the field 14. In some embodiments, the first and second agricultural vehicles 10, 12 may operate together as a first team 13 to accomplish the first task. For example, the first and second agricultural vehicles 10, 12 may pair with one another to accomplish the first task more quickly than operating individually. Hereinafter, when referring to two or more agricultural vehicles 8 working together as a "team," the team includes the two or more agricultural vehicles 8 joined (e.g., using a communication protocol) in a team. In further embodiments, the agricultural vehicle 8 may communicate with other devices (e.g., using the communication protocol) to coordinate activity with those other devices (e.g., tablets, mobile device, computer devices, etc.). When a variety of agricultural vehicles (e.g., two or more agricultural vehicles) pair with one another, the pair may be a subset of the team. In the illustrated embodiment, the first and second agricultural vehicles 10, 12 are configured to couple to a tool 17, which may include a variety of ground engaging members to facilitate accomplishing the first task (e.g., tilling rows 16 in the field).

In the illustrated embodiment, additional agricultural vehicles 8, such as a third agricultural vehicle 18 and a fourth agricultural vehicle 19, may operate together as a second team 15 to accomplish a second task, such as harvesting crops 20. For example, in the illustrated embodiment, the third agricultural vehicle 18 includes a harvesting unit 21 positioned on the front of the third agricultural vehicle 18. The third agricultural vehicle 18 may include a conveyor 22 that outputs the harvested crops. Furthermore, the fourth agricultural vehicle 19 may include a mobile storage compartment 23 (e.g., grain cart) to transport harvested crops to a suitable location. The third agricultural vehicle 18 and the fourth agricultural vehicle 19 may pair to one another and work together (e.g., as the second team 15) to more efficiently accomplish the second task (e.g., harvesting crops 20). However, in alternative embodiments, any suitable number of agricultural vehicles may pair to one another as a team to accomplish any suitable task. For example, two, three, five, eight, ten, or any other suitable number of agricultural vehicles may form a team and coordinate with one another to accomplish any number of suitable tasks. In further embodiments, a base station controller may coordinate the operations of the agricultural vehicles to accomplish any number of suitable tasks. The base station controller may pair with a controller of the agricultural vehicle or any agricultural vehicle. In some embodiments, the base station controller may create and join the teams (e.g., the first team 13 and/or the second team 15). Furthermore, the field 14 may include any suitable number of teams of agricultural vehicles 8. In some embodiments, any subset of the agricultural vehicles in the team(s) may pair with one another.

Furthermore, in some embodiments, any agricultural vehicle 8 may create a new team and be a vehicle (e.g., member) of the team. The "team leader," as used herein, refers to the agricultural vehicle 8 that creates (e.g., establishes) the team within a network 24 using a communication protocol 25. In some embodiments, the team leader may be assigned. Any of the agricultural vehicles 8 may be the "team leader." Any agricultural vehicle may create the team and any other vehicles may join the team. In some embodiments, the team may not require a team leader. For example, the team may remain when the team leader leaves the team (e.g., if other agricultural vehicles remain in the team). In further embodiments, the team leader may be treated like a member of the team. In the illustrated embodiment, the first agricultural vehicle 10 may be the "team leader" of the first team 13 and the third agricultural vehicle 18 may be the "team leader" of the second team 15. In some embodiments, the team leader may generate a new team that enables pairing between agricultural vehicles 8 within the team via the communication protocol 25. In some embodiment, the communication protocol 25 includes a wireless local area network (WLAN) protocol, a Bluetooth protocol, a cellular protocol, another suitable structural and/or proprietary protocol, or a combination thereof. The communication protocol 25 may be supported by an Ad-Hoc network, an Access Point network, a Mesh network, or a combination thereof, using other suitable types of networks. Furthermore, the network 24 may be established by a communication device 27. In some embodiments, the communication device 27 (e.g., a transceiver) may be on an agricultural vehicle 8, such that the agricultural vehicle establishes the network 24. That is, in some embodiments, the network 24 may be established by any agricultural vehicle using the communication device 27. In some embodiments, a controller may create the network 24.

In some embodiments, a transceiver 44 of the team leader may wirelessly broadcast information to other agricultural vehicles available to join the team leader in the team created by the team leader. As mentioned above, the communication may be enabled along the communication protocol 25. In some embodiments, an operator of the agricultural vehicle 8 may use a user interface of the agricultural vehicle 8 to either join an existing team or create a new team in the network 24. In some embodiments, the operator may create a new team when no team is available or established within the network 24. Accordingly, any agricultural vehicle 8 may be configured to become a team leader (e.g., to create a team) on the network 24 using the communication protocol 25. Alternatively or in addition, the operator may identify an existing team that may appear on a user interface of the agricultural vehicle 8, such that the operator may input a password to join the team. In some embodiments, a password may be input to join the network 24 and/or to join a team. In addition, an operator or an actuated system may establish a password (e.g., encryption key) when establishing a team.

The network 24 may enable communication of data between the agricultural vehicles 8 using the communication protocol 25. For example, in some embodiments, each agricultural vehicle 8 connected to the network 24 may communicate data such as a name of the agricultural vehicle 8, specifications of the agricultural vehicle 8 (e.g., fuel consumption, maximum torque, operation mode, etc.), a connection strength, a position, a vehicle, a heading, or a combination thereof, of agricultural vehicle 8, a role of the agricultural vehicle 8 (e.g., relative to other agricultural vehicles 8 in the team and/or network 24), a calibration status (e.g., whether an agricultural vehicle 8 is ready to be paired), or any combination thereof. Furthermore, other data, such as yield, obstacles, boundaries, swath, test messages, images, and the like, may be communicated between the agricultural vehicles using the communication protocol 25. The agricultural vehicles 8 may also communicate any other suitable data. Furthermore, in some embodiments, only agricultural vehicles that have joined the same team may share information with one another and/or coordinate operations with one another, such that unpaired vehicles and/or vehicles not in the team may not share information or coordinate operation with the vehicles of the pair/team. That is, the agricultural vehicles may share a first set of information within a network, the agricultural vehicles may share a second set of information within the team, the agricultural vehicles may share a third set of information with paired agricultural vehicle(s), or any combination thereof. The first, second, and third set of information may each include different information, the same information, or only share subsets of information.

In some embodiments, the network 24 may include a coverage area 26. The agricultural vehicles 8 within the bounds of the coverage area 26 that have accessed the network 24 may communicate data with each other, create (e.g., host) a team using the communication protocol 25, join a team, or any combination thereof. The network 24 may have any suitable coverage area 26. For example, the coverage area 26 may substantially cover a portion of the field 14 or the entire field 14. In some embodiments, there may be multiple teams in the same coverage area. In the illustrated embodiment, the size of the coverage area 26 is not drawn to scale and is depicted to facilitate discussion.

In some embodiments, communicating (e.g., exchanging) data between the agricultural vehicles 8 (e.g., the first, second, third, and fourth agricultural vehicles 10, 12, 18, 19) may enhance operations. Data communicated between the agricultural vehicles 8 may include the position of each agricultural vehicle 8, the distance away from other agricultural vehicles 8 having access to the network 24, and the like, such that the agricultural vehicles 8 may have access to information indicative of the position of the other agricultural vehicles 8 in the field 14. For example, each agricultural vehicle may use the position information to maintain a distance from other agricultural vehicles 8 to substantially reduce or eliminate the possibility of interference with the other agricultural vehicles 8. Additionally, in some embodiments, communicating data, such as the role of one agricultural vehicle 8 to other agricultural vehicles 8 may facilitate coordinating operations in teams. For example, in the illustrated embodiment, the third agricultural vehicle 18 is a harvester that may output harvested from of the conveyer 22, and the fourth agricultural vehicle 19 tows the storage compartment 23 (e.g., grain cart) to transport harvested crops to a suitable location. As such, the third agricultural vehicle 18 may coordinate operations with the fourth agricultural vehicle 19 when the fourth agricultural vehicle 19 pairs with the third agricultural vehicle 18 in the second team 15. In some embodiments, pairing may be enabled on demand. In some embodiments, communication between (e.g., two) agricultural vehicles 8 may lead to forming a team. The agricultural vehicles 8 may pair if the agricultural vehicles in the team are compatible and may work together (e.g., coordinate operations). For example, by communicating data indicative of their respective roles, the third agricultural vehicle 18 and the fourth agricultural vehicle 19 may pair to one another, such that the fourth agricultural vehicle 19 joins the team (e.g., the second team 15) hosted by the third agricultural vehicle 18 in the network 24. As such, the third and fourth agricultural vehicles 18, 19 may operate as the second team 15, such that that the third agricultural vehicle 18 harvests the crops 20, and the fourth agricultural vehicle 19 transports the crops away to a suitable location after receiving the crops from the third agricultural vehicle 18 via the conveyer.

In some embodiments, the pairing of agricultural vehicles 8 to coordinate operations to achieve a task as a team may be based on their respective roles, which are communicated via the network 24. For example, in some embodiments, the third agricultural vehicle 18 may only pair with other agricultural vehicles 8 identified as haul vehicles. That is, in some embodiments, haul vehicles may only form a team with haul vehicles and harvesters, and harvesters may only form a team with haul vehicles and harvesters. While, in the illustrated embodiment, only agricultural vehicles 8 are shown communicatively coupled to the network 24, in further embodiments, other devices, such as mobile devices, computers, other motor vehicles, and the like, may also be communicatively coupled to the network 24 via the communication protocol 25.

Figure 2:
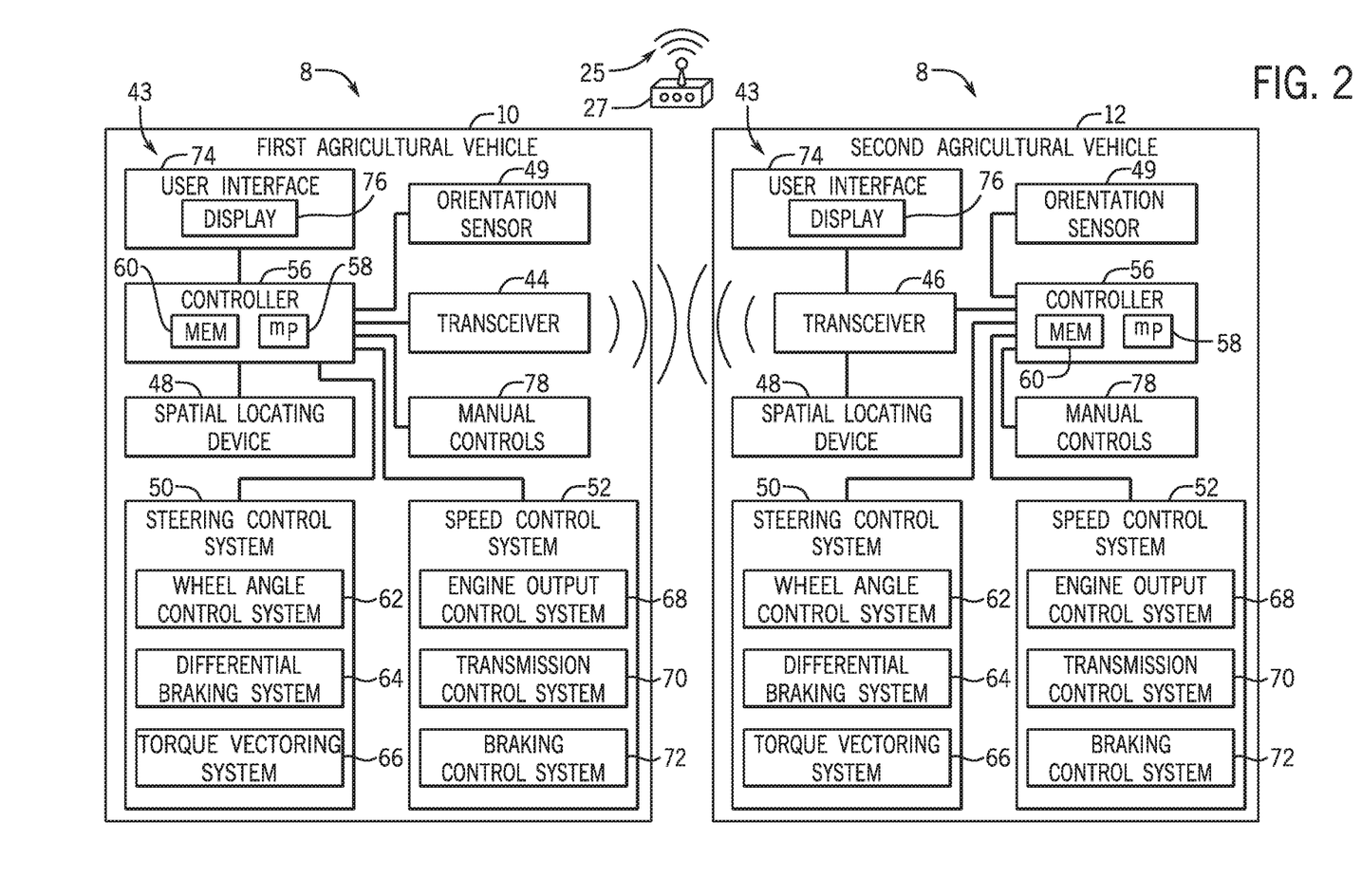
FIG. 2 is a schematic diagram of an embodiment of a first agricultural vehicle and a second agricultural vehicle or any of a plurality of agricultural vehicles that are communicatively coupled in a team via the network of FIG. 1 using the communication protocol of FIG. 1.

FIG. 2 is a schematic diagram of an embodiment of a first agricultural vehicle 10 and a second agricultural vehicle 12 that are communicatively coupled in a team (e.g., the first team 13) using the communication protocol 25 of FIG. 1. While the first and second agricultural vehicles 10, 12 are described below, the other agricultural vehicles 8, such as the third agricultural vehicle and the fourth agricultural vehicle may include similar components. Furthermore, while the first and second agricultural vehicles 10, 12 are described as being communicatively coupled, in further embodiments, any of a plurality of agricultural vehicles may communicatively couple with one another.

In the illustrated embodiment, the first agricultural vehicle 10 and the second agricultural vehicle 12 each include a control system 43. In the illustrated embodiment, the first agricultural vehicle 10 is the team leader (e.g., the agricultural vehicle who established the first team 13). After creating the first team and serving as the team leader, the first agricultural vehicle 10 may wirelessly broadcast and enable access to the first team 13 via a first transceiver 44 using the communication protocol 25. The first transceiver 44 of the first agricultural vehicle 10 is configured to facilitate and/or enable communication with a second transceiver 46, for example, of the second agricultural vehicle 12 using the communication protocol 25. As mentioned above, in some embodiments, the agricultural vehicles may only communicate with other agricultural vehicles on the same team, but in further embodiments, any agricultural vehicle having access to the network 24 may communicate with any other agricultural vehicle having access to the network 25. In yet additional embodiments, a first subset of data may be communicated between agricultural vehicles on the same team, while a second subset of data may be communicated between agricultural vehicles having access to the network. For example, the first and second agricultural vehicles 10, 12 may be communicatively coupled in the first team 13, and the third and fourth agricultural vehicles 18, 19 may be communicatively coupled in the second team 15. Accordingly, that a first subset of data may be communicated only between the first and second agricultural vehicles 10, 12 because they are paired in the first team 13, and a second subset of data may be communicated between the first, second, third, and fourth agricultural vehicles 10, 12, 18, 19 because they have access to the network (e.g., despite not being in the same a team).

Furthermore, the first and second transceivers 44, 46 may operate at any suitable frequency range within the electromagnetic spectrum. For example, in certain embodiments, the transceivers may broadcast and receive radio waves within a frequency range of about 1 GHz to about 10 GHz. In addition, the first and second transceivers may utilize any suitable communication protocol 25, such as a standard protocol (e.g., Wi-Fi, Bluetooth, etc.) or a proprietary protocol.

As mentioned above, the agricultural vehicles 8 communicatively coupled with one another using the communication protocol 25 may communicate data, such as position, data, and/or velocity data with one another. As used herein, "position" refers to a position vector, such as a one, two, or three-dimensional position vector. For example, a two-dimensional position vector may include latitude and longitude, and a three-dimensional position vector may include latitude, longitude, and altitude/elevation. The position vector may be represented in a rectangular, polar, cylindrical, or spherical coordinate system, among other suitable coordinate systems. In addition, as used herein, "velocity" refers to a velocity vector, such as a one, two, or three-dimensional velocity vector. For example, a one-dimensional velocity vector may include speed (e.g., ground speed), a two-dimensional velocity vector may include speed (e.g., ground speed) and heading within a plane (e.g., along a ground plane), and a three-dimensional velocity vector may include speed and heading within a three-dimensional space. Similar to the position vector, the velocity vector may be represented in a rectangular, polar, cylindrical, or spherical coordinate system, among other suitable coordinate systems. In certain embodiments, the velocity may be represented as a unit/normalized vector (e.g., a vector having a unit magnitude). In such embodiments, the magnitude (e.g., speed) is not included in the velocity vector. For example, a two-dimensional velocity unit vector may be representative of heading within a plane (e.g., along a ground plane), and a three-dimensional velocity unit vector may be representative of heading within a three-dimensional space.

The control system 43 of each of the first and second agricultural vehicles 10, 12 may also include a spatial locating device 48, which is mounted to the respective agricultural vehicle and configured to facilitate determining the position and velocity. The spatial locating device may include any suitable system configured to measure the position and, in certain embodiments, the velocity of the agricultural vehicle, such as a global positioning system (GPS), for example. In certain embodiments, the spatial locating device 48 may be configured to measure the position and velocity of the agricultural vehicle relative to a fixed point within a field (e.g., via a fixed radio transceiver). Accordingly, the spatial locating device 48 may be configured to measure the position and velocity of the agricultural vehicle relative to a fixed global coordinate system (e.g., via the GPS) or a fixed local coordinate system. In certain embodiments, the first and second transceivers 44, 46 are configured to broadcast the position, velocity, and other information discussed below to other agricultural vehicles 8 within the coverage area.

In addition, the control system 43 of each of the first and second agricultural vehicles includes a respective orientation sensor 49 configured to determine a pitch angle, a yaw angle, a roll angle, or a combination thereof, of the agricultural vehicle. For example, the orientation sensor 49 may include a gyroscope or other suitable sensor(s) configured to monitor the orientation of each agricultural vehicle. In certain embodiments, the orientation sensor 49 is also configured to determine a pitch rate, a yaw rate, a roll rate, or a combination thereof. Furthermore, in certain embodiments, the respective orientations of the agricultural vehicles may be communicated to other agricultural vehicles 8 via network 24. In some embodiments, the agricultural vehicle control system 43 is configured to compare the orientation (e.g., pitch angle, yaw angle, roll angle, or a combination thereof) of the first agricultural vehicle 10 to the orientation (e.g., pitch angle, yaw angle, roll angle, or a combination thereof) of the second agricultural vehicle 12, for example, to coordinate operations between the first agricultural vehicle 10 and the second agricultural vehicle 12. As mentioned above, similar techniques may be used with respect to other agricultural vehicles 8, such as the third agricultural vehicle 18 and the fourth agricultural vehicle 19.

In the illustrated embodiment, the control system 43 of each of the first and second agricultural vehicles 10, 12 includes an automated steering control system 50 configured to control a direction of movement of the corresponding agricultural vehicle 8, and an automated speed control system 52 configured to control a speed of the corresponding agricultural vehicle 8. In addition, each control system 43 includes a controller 56 communicatively coupled to the corresponding transceiver (e.g., first transceiver 44 or second transceiver 46), to the spatial locating device 48, to the automated steering control system 50, and to the automated speed control system 52. The controller 56 is configured to automatically control certain features of the respective agricultural vehicle 8 (e.g., the first agricultural vehicle 10 or the second agricultural vehicle 12). The controller 56 may also enable an operator to access (e.g., enter the agricultural vehicle, control the controller 56, or a combination thereof) the agricultural vehicle 8 after the operator provides login credentials. For example, the controller 56 may identify that an operator has accessed the agricultural vehicle 8, and the controller 56 may prompt the operator (e.g., via a user interface) to input login credentials to access (e.g., to communicatively couple to) the network 24. In some embodiments, after gaining access to the agricultural vehicle 8, the operator may provide login information to access the existing network 24. After accessing the network 24 (e.g., Wi-Fi network), the controller 56 may provide information indicative of other agricultural vehicles 8 that may be available to form a team. That is, in some embodiments, an operator may log into the agricultural vehicle 8 and then log into the network 24. Alternatively or in addition, the controller 56 may enable an operator to establish a new team on the network 24, whereby the agricultural vehicle 8 that the operator accessed becomes the team leader (e.g., establishes a new team that may be joined by one or more other vehicles). Furthermore, the controller 56 may enable the communication of data to and from other agricultural vehicles 8 communicatively coupled to the team leader via the network 24. As mentioned above, communication between agricultural vehicles may be enabled within the network 24 via corresponding transceivers.

In certain embodiments, the controller 56 is an electronic controller having electrical circuitry configured to process data from the transceiver 44, the spatial locating device 48, and/or other components of the control system 43. In the illustrated embodiment, the controller 56 include a processor, such as the illustrated microprocessor 58, and a memory device 60. The controller 56 may also include one or more storage devices and/or other suitable components. The processor 58 may be used to execute software, such as software for controlling the agricultural vehicle 8, and so forth. Moreover, the processor 58 may include multiple microprocessors, one or more "general-purpose" microprocessors, one or more special-purpose microprocessors, and/or one or more application specific integrated circuits (ASICS), or some combination thereof. For example, the processor 58 may include one or more reduced instruction set (RISC) processors.

The memory device 60 may include a volatile memory, such as random access memory (RAM), and/or a nonvolatile memory, such as read-only memory (ROM). The memory device 60 may store a variety of information and may be used for various purposes. For example, the memory device 60 may store processor-executable instructions (e.g., firmware or software) for the processor 58 to execute, such as instructions for controlling the agricultural vehicle 8. The storage device(s) (e.g., nonvolatile storage) may include ROM, flash memory, a hard drive, or any other suitable optical, magnetic, or solid-state storage medium, or a combination thereof. The storage device(s) may store data (e.g., position data, identification data, etc.), instructions (e.g., software or firmware for controlling the agricultural vehicle, etc.), and any other suitable data.

In the illustrated embodiment, the automated steering control system 50 includes a wheel angle control system 62, a differential braking system 64, and a torque vectoring system 66. The wheel angle control system 62 may automatically rotate one or more wheels of the agricultural vehicle 8 (e.g., via hydraulic actuators) to steer the agricultural vehicle 8 along a desired route. By way of example, the wheel angle control system 62 may rotate front wheels, rear wheels, and/or intermediate wheels of the agricultural vehicle 8, either individually or in groups. The differential braking system 64 may independently vary the braking force on each lateral side of the agricultural vehicle 8 to direct the agricultural vehicle 8 along the desired route. Similarly, the torque vectoring system 66 may differentially apply torque from an engine to wheels and/or tracks on each lateral side of the agricultural vehicle 8, thereby directing the agricultural vehicle 8 along a desired route. While the illustrated steering control system 50 includes the wheel angle control system 62, the differential braking system 64, and the torque vectoring system 66, alternative embodiments may include one or two of these systems, in any suitable combination. Further embodiments may include an automated steering control system 50 having other and/or additional systems to facilitate directing the agricultural vehicle 8 along the desired route.

In the illustrated embodiment, the speed control system 52 includes an engine output control system 68, a transmission control system 70, and a braking control system 72. The engine output control system 68 is configured to vary the output of the engine to control the speed of the agricultural vehicle 8. For example, the engine output control system 68 may vary a throttle setting of the engine, a fuel/air mixture of the engine, a timing of the engine, and/or other suitable engine parameters to control engine output. In addition, the transmission control system 70 may adjust gear selection within a transmission to control the speed of the agricultural vehicle 8. Furthermore, the braking control system 72 may adjust braking force, thereby controlling the speed of the agricultural vehicle 8. While the illustrated automated speed control system 52 includes the engine output control system 68, the transmission control system 70, and the braking control system 72, alternative embodiments may include one or two of these systems, in any suitable combination. Further embodiments may include an automated speed control system 52 having other and/or additional systems to facilitate adjusting the speed of the agricultural vehicle.

In the illustrated embodiment, the agricultural vehicle control system 43 includes a user interface 74 communicatively coupled to the controller 56. The user interface 74 is configured to selectively instruct the controller 56 to join the team of the team leader in response to user input. The user interface 74 is also configured to selectively instruct the controller 56 to become a team leader, thereby creating a new team that enables one or more other agricultural vehicles to join. For example, the user interface 74 may prompt an operator to input login credentials (e.g., a password) to access the user interface 74 that enables the agricultural vehicle 8 (e.g., the first agricultural vehicle 10), log in to the network, to establish a new team, join an existing tea, and the like. The user interface 74 may prompt the operator to join an existing team hosted by a team leader using the communication protocol 25 and/or to create a new team (e.g., become a new team leader). In some embodiments, the user interface 74 may prompt the operator to establish the network 24. In certain embodiments, the user interface includes a display 76 configured to present data to the operator, such as the name of the agricultural vehicle 8, the state of the agricultural vehicle 8 (e.g., fuel consumption, maximum torque, operation mode, etc.), the connection strength, a distance to other agricultural vehicles 8, a role of the agricultural vehicle 8 relative to other agricultural vehicles 8 in a network (e.g., communication network) and/or team, a calibration status (e.g., whether an agricultural vehicle 8 is ready to be paired), or any combination thereof. However, in further embodiments, the display 76 may depict any suitable data communicated via the network and/or available to the agricultural vehicle.

As illustrated, the agricultural vehicles 8 includes manual controls 78 configured to enable an operator to control the agricultural. The manual controls 78 may include manual steering control, manual transmission control, and/or manual braking control, or a combination thereof, among other controls. In the illustrated embodiment, the manual controls 78 are communicatively coupled to the controller 56. The controller 56 is configured to disengage automatic control of the agricultural vehicle upon receiving a signal indicative of manual control of the agricultural vehicle. However, in further embodiments, the manual controls or any of the aforementioned components (e.g., the speed control system, the torque vectoring system 66, etc.) of the agricultural vehicle 8 may be omitted.

Figure 3:
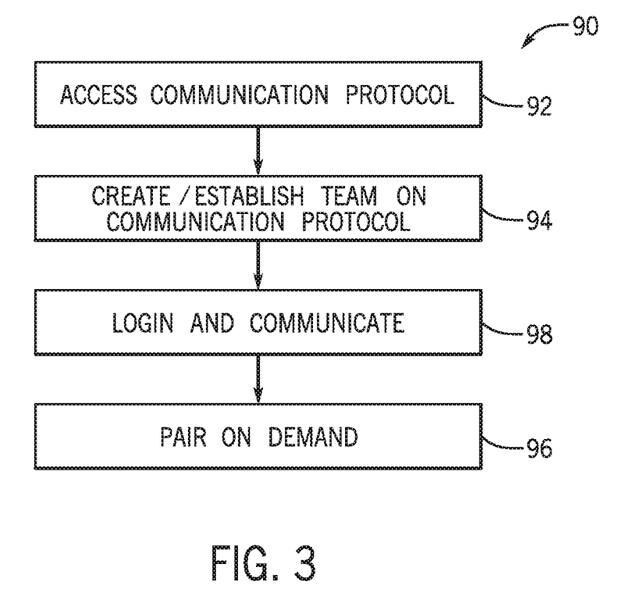
FIG. 3 is a flow diagram of an embodiment of a method for enabling communication and pairing of agricultural vehicles via the network of FIG. 1 using the communication protocol of FIG. 1.

FIG. 3 is a flow diagram 90 of an embodiment of a method for enabling communication and pairing of agricultural vehicles via the network of FIG. 1 using the communication protocol of FIG. 1. The steps illustrated in the flow diagram 90 are meant to facilitate discussion and are not meant to be limiting since additional steps may be performed, certain steps may be omitted, and the illustrated steps may be performed in any order. Using the techniques described herein, communication between agricultural vehicles may be coordinated by team leader(s) that create respective team(s), such that the team leader may communicatively couple with other suitable agricultural vehicles to coordinate operations and accomplish a task using the combined resources of the team. Prior to becoming a team leader, the agricultural vehicle 8 may access the network (e.g., Wi-Fi network) (process block 92). As mentioned above, the network may enable wireless communication between the agricultural vehicles and other devices having access and being communicatively coupled to the network. In some embodiments, the network may enable communication between respective controllers of agricultural vehicles. The communication may occur within a field where the agricultural vehicles and the other devices operate. In some embodiments, the operator of the agricultural vehicle may provide, via the user interface, a password to the controller, whereby the correct password enables access to the network. In other embodiments, the network may not be password protected, and the controller of the agricultural vehicle may access and communicatively couple to the network by selecting the network on the user interface. In further embodiments, the agricultural vehicle may establish the network. After accessing the network, the controller may prompt an operator to establish a team (process block 94) and/or join an existing team. After accessing the network, the controller may prompt (e.g., via the display of the user interface) the operator to input information to establish the agricultural vehicle as the team leader for a new team.

After establishing a team (process block 94), the controller of the team leader may enable other agricultural vehicles to join the team when other agricultural vehicles provide login credentials (process block 96). For example, after the team is established by a team leader, another agricultural vehicle may join the team established by the team leader to communicatively couple with the team leader. For example, as depicted in the embodiment of FIG. 1, the first agricultural vehicle may establish the first team (e.g., and be the team leader), and the second agricultural vehicle may join the first team to communicatively couple with the first agricultural vehicle. In some embodiments, the operator of the second agricultural vehicle may input the password associated with the first team to pair (e.g., coordinate operations to accomplish a task) with the team leader (e.g., the first agricultural vehicle). In further embodiments, the operator of the second agricultural vehicle may select a desired team to join, such that the second agricultural vehicle communicatively couples with the agricultural vehicles associated with the selected desired team (e.g., the first team). The desired team may be the team that includes agricultural vehicles of a certain type that are configured to complete a common task (e.g., tillage, harvesting, etc.). However, in further embodiments, the desired team may be any suitable team established on the network.

After the team leader creates the team (process block 94), the controller may enable other agricultural vehicles to join the team by providing login credentials (process block 96). In some embodiments, the operators of the agricultural vehicles provide login credentials to the graphical user interface prompts. Providing the login credentials may include providing a password to the user interface. After the team leader and the other agricultural vehicles are part of the team, the controller may login and communication (process block 98). As mentioned above, any suitable data may be communicated between the agricultural vehicles of the team.

Figure 4:
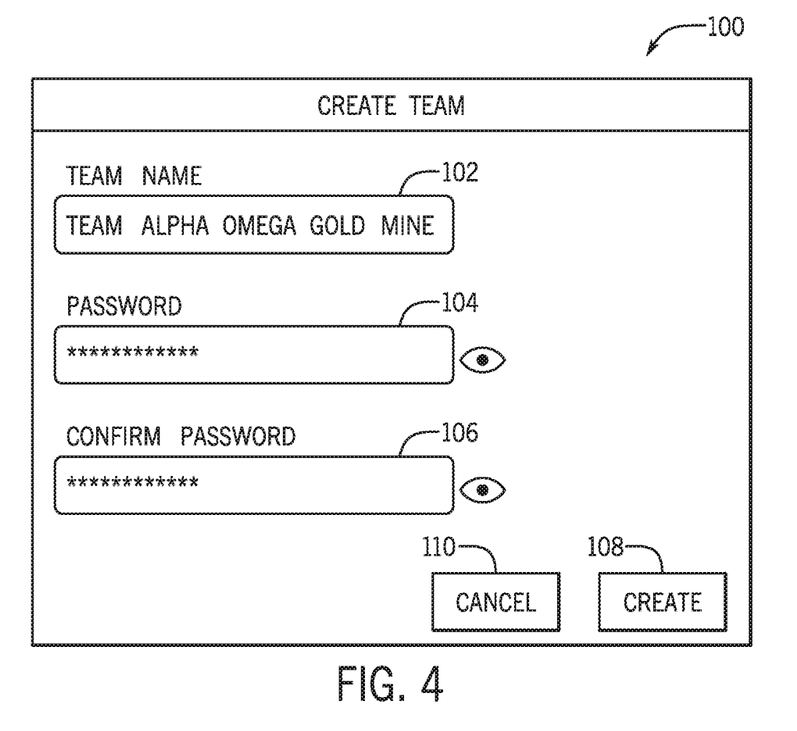
FIG. 4 is a block diagram of an embodiment of a first set of graphical user interface prompts for a team leader establishing a team via the network of FIG. 1 using the communication protocol of FIG. 1.

FIG. 4 is a block diagram of an embodiment of a first set of graphical user interface prompts 100 for a team leader establishing a team on the network of FIG. 1. The first set of graphical user interface prompts 100 may be displayed on the display and receive various inputs from the operator to establish the team. In the illustrated embodiment, the controller may receive, via the user interface, a first user input 102 indicative of a name of the team, a second user input 104 indicative of a password, a third user input 106 indicative of a confirmation of the password. For example, in the illustrated embodiment the name of the team is "TEAM ALPHA OMEGA GOLD MINE," but in further embodiments, the name of the team may include any suitable text (e.g., characters) that may facilitate identification of the team. Furthermore, in some embodiments, the team is created by the controller of the team leader after receiving the second user input 104 (e.g., the password) and the third user input 106 (the password confirmation) that match, and a "create" button 108 is selected. In some embodiments, the password fields may be omitted or left blank. As mentioned above, in some embodiments, the first set of graphical user interface prompts 100 may omit the second and third user inputs 104, 106, such that the controller 56 of the agricultural vehicle 8 may create the team in response to receiving the first user input 102 (e.g., the team name) and an indication that the "create" button 108 was selected. In some embodiments, the controller 56 may automatically establish the team name (e.g., "TEAM 1," "TEAM 2," etc.) by selecting the "create" option 108 without entering a team name. In the illustrated embodiment, the first set of graphical user interface prompts 100 includes a cancel option 110 that may stop the new team from being created.

Figure 5:
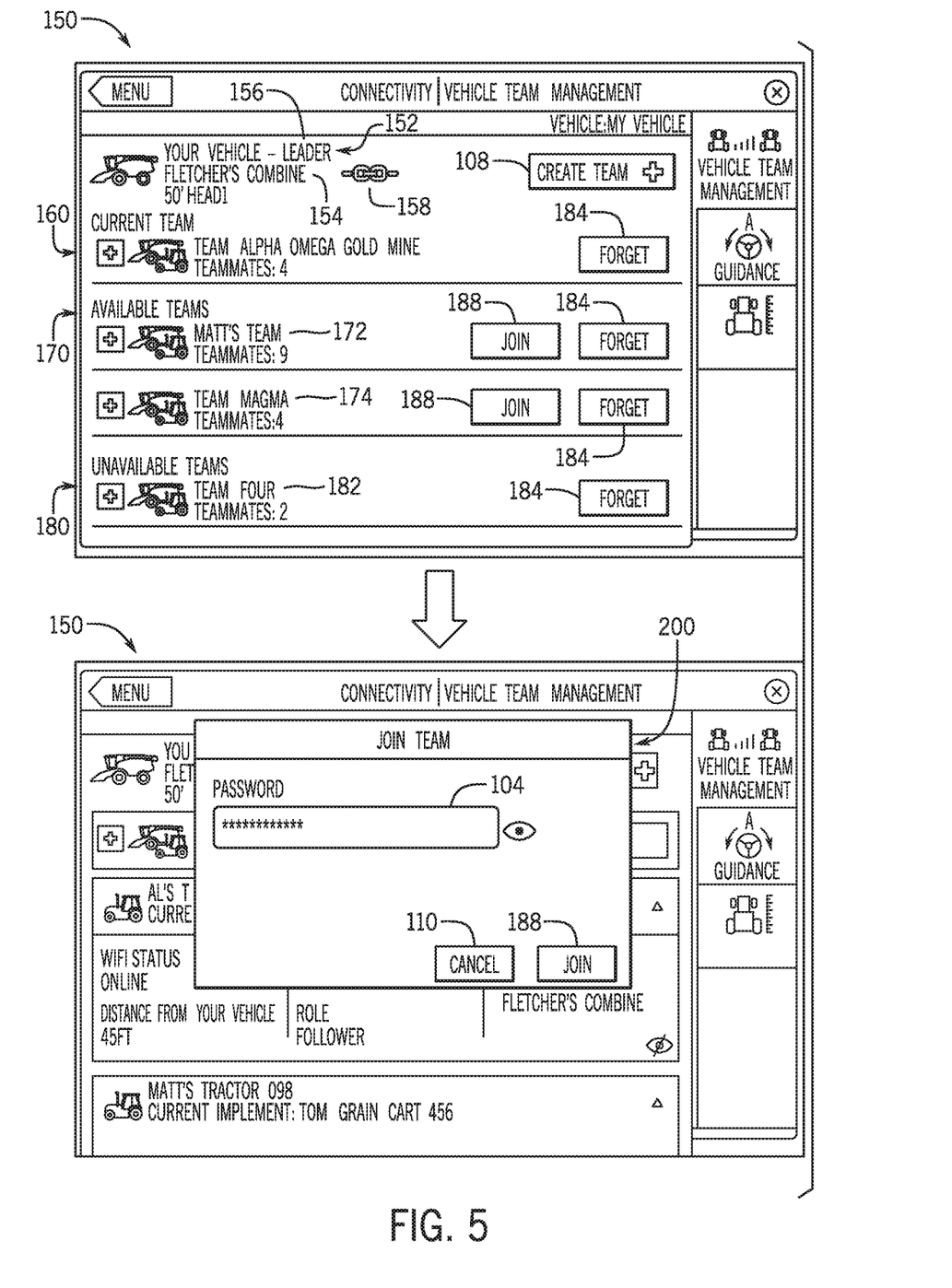
FIG. 5 is a block diagram of an embodiment of second and third sets of graphical user interface prompts for joining the team established by the team leader via the network of FIG. 1 using the communication protocol of FIG. 1.

FIG. 5 is a block diagram of an embodiment of second and third sets of graphical user interface prompts 150, 200 for joining the team established by the team leader on the network 24 of FIG. 1 using the communication protocol 25 of FIG. 1. The second and third sets of graphical user interface prompts 150, 200 may include various selection options for choosing the team to join. In the illustrated embodiment, the second set of graphical user interface prompts 150 represents a team management system configured to enable operation of the agricultural vehicles to create new teams and join existing teams. For example, in the illustrated embodiment, the second set of graphical user interface prompts 150 includes the create option 151 that may enable the controller 56 to establish (e.g., create) a new team. As mentioned above, selecting the create option 151 may bring up the first graphical user interface prompts 100 of FIG. 4. In some embodiments, the operator may desire to instead join an existing team hosted by another agricultural vehicle (e.g., the team leader).

In the illustrated embodiment, self-identification information 152 may be included in the second set of graphical user interface prompts 150. For example, the self-identification information 152 may include the name 154 of the agricultural vehicle 8 (e.g., "FLETCHER'S COMBINE"), the role 156 of the agricultural vehicle (e.g., team leader, follower, etc.), a joining indication 158, any other suitable self-identification information, or a combination thereof. In the illustrated embodiment, the joining indication 158 is a chain image, such that when the chain image is present, it serves as an indication that the agricultural vehicle is currently joined to the team via the network or paired to another agricultural vehicle. In some embodiments, when the agricultural vehicle is not joined to a team or paired to another agricultural vehicle, the chain image may not be present on the second set of graphical user interface prompts 150.

In the illustrated embodiment, the second set of graphical user interface prompts 150 may also include team information 160. The team information 160 may provide information associated with the team of which the agricultural vehicle is a member. For example, the team information 160 may be present when the agricultural vehicle joins to the team created by the team leader. In addition, the team leader may also provide the team information 160 for the team established by the team leader. In the illustrated embodiment, the second set of graphical user interface prompts 150 also includes available team information 170. The available team information 170 includes information about the teams on the network that may be joined, such that joining the team may enable the agricultural vehicle to pair the joining agricultural vehicle to other agricultural vehicles in the team to facilitate coordination (e.g., accomplishing a similar task), as described in detail above. For example, in the illustrated embodiment, a first available team 172 (e.g., Matt's team) and a second available team 174 (e.g., Team Magma) may be shown as the available teams that may be joined. In some embodiments, the available team information 170 includes the number of teammates in the team. Teammates refer to other agricultural vehicles that are communicatively coupled in the team (e.g., after joining the team), which may include the team leader. For example, in the depicted embodiment, the first available team 172 (e.g., Matt's team) includes nine teammates and the second available team 174 (e.g., Team Magma) includes two teammates. Furthermore, the second set of graphical user interface prompts 150 may include other team information 180, such that the other teams are shown as available on the network 24. The other team information 180 may include a team name 182 (e.g., Team Four). In addition, the team information 180 may include unavailable teams. A team may be unavailable to join when the team is performing a task to which the agricultural vehicle is not suited. For example, an agricultural that is a tilling vehicle could not join a team of harvesting agricultural vehicles. Furthermore, a team that was previously joined but is not currently available may be an unavailable team.

The second set of graphical user interface prompts 150 may receive user inputs. For example, as mentioned above, the second set of graphical user interface prompts 150 may include the create option 151, which when selected (e.g., by an operator), prompts the controller 56 to establish a new team. Furthermore, the second set of graphical user interface prompts 150 may include a "forget" option 184. If the "forget" option 184 is selected by an operator, the team corresponding to the selected "forget" option 184 may be omitted from (e.g., not shown on) the second set graphical user interface prompts 150. For example, in the illustrated embodiment, when the "forget" option 184 next to the "TEAM ALPHA OMEGA GOLD MINE" is selected, the "TEAM ALPHA OMEGA GOLD MINE" may be omitted from the second set of graphical user interface prompts 150. That is, if the operator of the agricultural vehicles chooses to "forget" an available team, the available team is removed from the list, but if the operator forgets her/his current team, the agricultural vehicle being operated by the operator is removed from the team (e.g., the agricultural vehicle is removed from the list). Alternatively or in addition, if the agricultural vehicle is the team leader and it receives the selection to "forget" the current team, the team may be deleted or the team could be maintained by another team leader. In some embodiments, the team may also be maintained if the team leader is not required.

In addition, the second set of graphical user interface prompts 150 may include a "join" option 188, such that when the "join" option 188 is selected, the agricultural vehicle may join the team corresponding to the selected "join" option. For example, when the controller 56 receives a user input indicative of selecting the "join" option 188 corresponding to the "TEAM FOUR," the agricultural vehicle joins the "TEAM FOUR" and may pair with the agricultural vehicle(s) in "TEAM FOUR." If the "join" option 188 is selected, the third set of graphical user interface prompts 200 may be displayed. The third set of graphical user interface prompts 200 may receive a user input indicative of the password 104, such that the password must match when the "join" option 188 is selected or a message prompt indicating the password is wrong is displayed. The operator may select the "cancel" option 110, whereby the team is not joined. In some embodiments, selecting the "cancel" option 110 may send an operator back to the second set of graphical user interface prompts 150. Furthermore, if a certain agricultural vehicle is in a team and wishes to join another team, the certain agricultural may be removed (e.g., listed as no longer active) from their original team and added to the other team. While only certain user input options are depicted in FIG. 5, in further embodiments, the second and third sets of graphical user interface prompts 150 may receive other suitable user inputs and display other suitable options.

As mentioned above, after the team leader creates the team (process block 94), the controller may enable other agricultural vehicles to join the team by providing login credentials (process block 96). In some embodiments, the operators of the agricultural vehicles provide login credentials to the graphical user interface. Providing the login credentials may include providing the password 104 to the user interface. In some embodiments, the password 104 is the password. After the team leader and the other agricultural vehicles are part of the team, the controller may enable communication (process block 98). As mentioned above, any suitable data may be communicated between the agricultural vehicles of the team.

Figure 6:
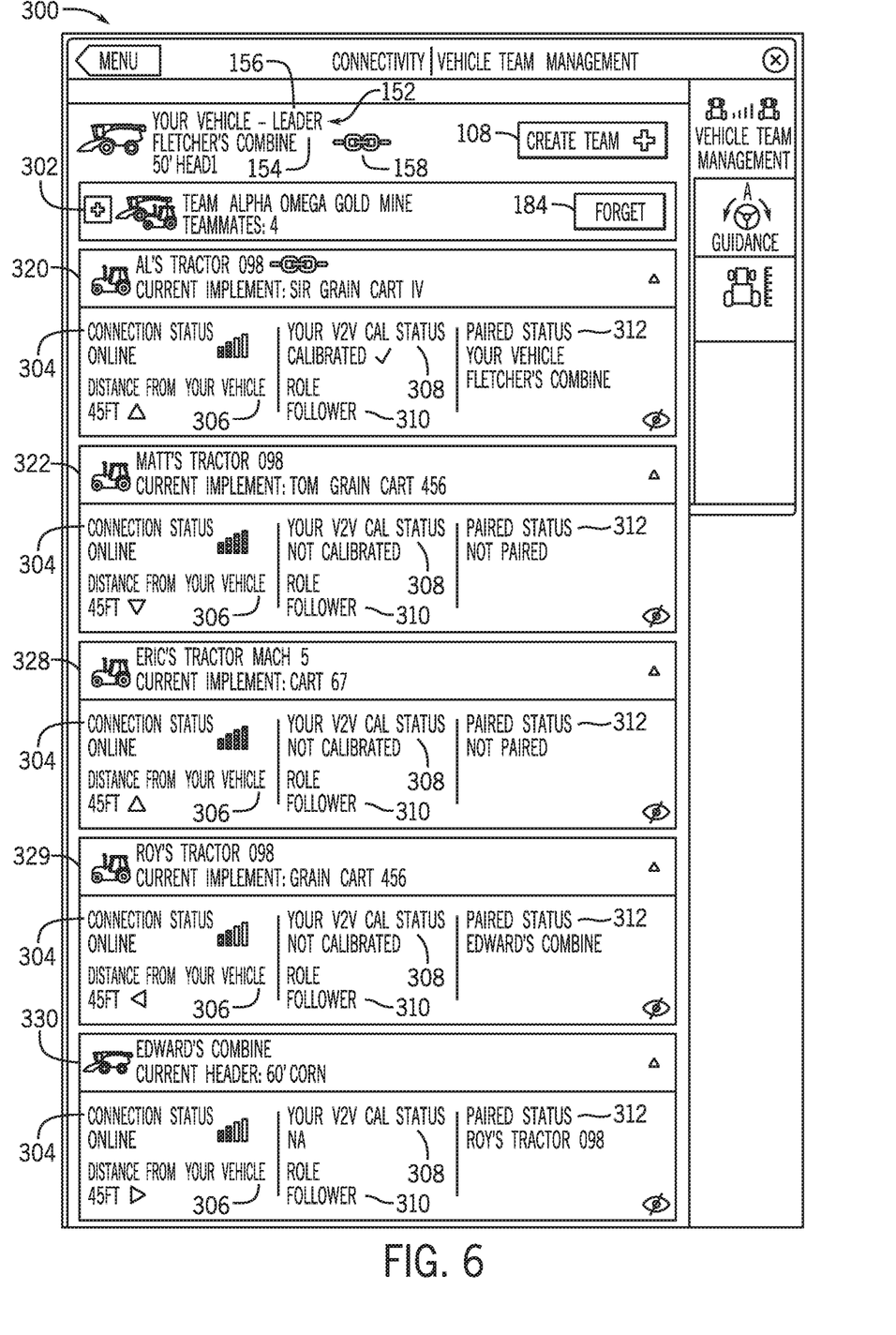
FIG. 6 is a block diagram of an embodiment of a fourth set of graphical user interface prompts depicting information associated with the agricultural vehicles that use the communication protocol of FIG. 1.

FIG. 6 is a block diagram of an embodiment of fourth set of a graphical user interface prompts 300 depicting information associated with the agricultural vehicles 8 in the network 24 of FIG. 1. In the illustrated embodiment, any of the information depicted on the fourth set of graphical user interface prompts 300 may be communicated to the agricultural vehicles in the team. In the illustrated embodiment, the self-identification information 152 is included in the fourth set of graphical user interface prompts 300. For example, as mentioned above, the self-identification information 152 may include the name 154 of the agricultural vehicle 8 (e.g., "FLETCHER'S COMBINE"), the role 156 of the agricultural vehicle (e.g., team leader, follower, etc.), the joining indication 158, any other suitable self-identification information, or a combination thereof. In the illustrated embodiment, the joining indication 158 is a chain image, such that when the chain image is present, it serves as an indication that the agricultural vehicle is currently joined to a team and/or paired to other agricultural vehicle(s) (e.g., multiple agricultural vehicles) in the team via the network. When the agricultural vehicle is not join to a team or paired to another agricultural vehicle, the chain image is not present on the second set of graphical user interface prompts 150.

Furthermore, the fourth set of graphical user interface prompts 300 includes the connection status 304, the distance 306 from the agricultural vehicle to the agricultural vehicle of the operator, the calibration status 308 (e.g., whether an agricultural vehicle 8 is ready to be paired to another agricultural vehicle in the network), the role 310, and the paired status 312 for each of the vehicles in the team. In the illustrated embodiment, the team is "ALPHA OMEGA GOLD MINE." The team includes a fifth agricultural vehicle 320 (e.g., AL'S TRACTOR 098), a sixth vehicle 322 (e.g., MATT'S TRACTOR 098), a seventh agricultural vehicle 328 (e.g., ERIC'S TRACTOR MACH 5), an eighth agricultural vehicle 329 (e.g., ROY'S TRACTOR 098), and a ninth agricultural vehicle 330 (e.g., EDWARD'S COMBINE). Data, such as the connection status 304, the distance 306 from the vehicle of the operator, the calibration status 308, the role 310, the paired status 312 for each of the agricultural vehicles in the team, any other suitable data, or a combination thereof may be communicated between the agricultural vehicles of the team. Furthermore, the agricultural vehicles in the team may pair (e.g., coordinate operations with one another by communicating with one another) to accomplish a task, as described above. For example, a harvester may pair with a haul vehicle(s) to facilitate crop transfer.

Present techniques and systems include agricultural vehicles that may access (e.g., join) a network established by an agricultural vehicle or any suitable network establishing device. In some instances, joining the network may include providing a password. After the agricultural vehicle joins the network, the agricultural vehicle may establish a new team (e.g., that may be password protected) in the network or join an existing team (e.g., after providing a password) in the network. After the agricultural vehicle joins the team, the agricultural vehicle may pair with compatible agricultural vehicles in the team based on need. For example, a harvester may pair with a haul vehicle to facilitate crop transfer when the harvester is not already paired and is harvesting crops. Furthermore, incompatible agricultural vehicles may not pair. For example, a towing tractor and a tilling tractor may not pair because they are incompatible (e.g. they are configured to accomplish different tasks).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A control system for a first agricultural vehicle, comprising:
a first transceiver configured to communicatively couple to a second transceiver of a second agricultural vehicle via a communication network; and
a first controller communicatively coupled to the first transceiver, wherein the first controller comprises a processor and a memory device storing instructions thereon that when executed by the processor cause the processor to:
receive an input to create a first team of agricultural vehicles including the first agricultural vehicle;
output a first signal to the communication network in response to the input, wherein the first signal is accessible by the second agricultural vehicle;
establish the first team of agricultural vehicles and cause the second agricultural vehicle to join the first team of agricultural vehicles in response to receipt of a second signal from the second agricultural vehicle via the communication network, wherein the second signal is indicative of login credentials; and
enable communication between the first agricultural vehicle and the second agricultural vehicle via the communication network to facilitate coordination between the first and second agricultural vehicles.

2. The control system of claim 1, wherein the instructions when executed cause the processor to pair the first agricultural vehicle with the second agricultural vehicle in response to receiving a third signal indicative of the second agricultural vehicle being compatible with the first agricultural vehicle.

3. The control system of claim 2, wherein the instructions that cause the processor to pair the first agricultural vehicle with the second agricultural vehicle when executed cause the processor to coordinate operation among the first and second agricultural vehicles to accomplish different elements of a common task.

4. The control system of claim 3, wherein the different elements of the common task comprise a first element performed by the first agricultural vehicle and a second element performed by the second agricultural vehicle.

5. The control system of claim 4, wherein the common task comprises harvesting product, the first element comprises harvesting the product, and the second element comprises collecting and transporting the harvested product to a storage location.

6. The control system of claim 1, wherein the first team of agricultural vehicles is one of a plurality of teams of agricultural vehicles in the communication network.

7. The control system of claim 1, wherein the instructions when executed cause the processor to compare the login credentials to a password stored in the memory device, and wherein the instructions when executed cause the second agricultural vehicle to join the first team of agricultural vehicles only if the login credentials match the password.

8. The control system of claim 1, wherein the instructions when executed cause the processor to cause the second agricultural vehicle to join the first team of agricultural vehicles only after the first controller receives a user input indicative of a confirmation to grant the second agricultural vehicle access to join the first team of agricultural vehicles.

9. The control system of claim 1, comprising a user interface configured to receive the input from an operator, and wherein the instructions when executed cause the processor to:
confirm the second agricultural vehicle joining the first team of agricultural vehicles in response to the input; and
confirm a pairing of the first agricultural vehicle and the second agricultural vehicle in response to the input.

10. The control system of claim 1, wherein the instructions when executed cause the processor to share data between the first and second agricultural vehicles, wherein the data comprises information indicative of respective positions of the first and second agricultural vehicles, a distance between the first and second agricultural vehicles, respective roles of the first and second agricultural vehicles, or any combination thereof.

11. The control system of claim 1, wherein the communication network is established by the first agricultural vehicle or the second agricultural vehicle.

12. A method to enable communication between a plurality of agricultural vehicles, comprising:
receiving, via a processor of a first agricultural vehicle of the plurality of agricultural vehicles, an input to create a first team of agricultural vehicles including the first agricultural vehicle;
outputting, via the processor, a first signal to a wireless communication network in response to the input, wherein the first signal is accessible by a second agricultural vehicle of the plurality of agricultural vehicles;
establishing, via the processor, the first team of agricultural vehicles on the wireless communication network;
causing, via the processor, the second agricultural vehicle of the plurality of agricultural vehicles to join the first team of agricultural vehicles in response to receiving a second signal from the second agricultural vehicle, wherein the second signal is indicative of login credentials; and
enabling, via the processor, communication between a subset of the plurality of agricultural vehicles in the first team of agricultural vehicles via the wireless communication network to facilitate coordination between the subset of the plurality of agricultural vehicles in the first team of agricultural vehicles, wherein the subset of the plurality of agricultural vehicles in the first team of agricultural vehicles comprises the first agricultural vehicle and the second agricultural vehicle.

13. The method of claim 12, comprising removing, via the processor, the second agricultural vehicle from the first team of agricultural vehicles, in response to receiving a third signal indicative of removing the second agricultural vehicle from the first team of agricultural vehicles.

14. The method of claim 12, comprising enabling, via the processor, pairing of the second agricultural vehicle to the first agricultural vehicle to accomplish a common task.

15. The method of claim 12, comprising establishing, via the processor, the wireless communication network.

16. A control system for an agricultural vehicle, comprising:
a user interface comprising a display, wherein the user interface is configured to selectively output a first signal indicative of joining an existing team of agricultural vehicles on a wireless communication network and to output a second signal indicative of creating a new team of agricultural vehicles on the wireless communication network; and a controller communicatively coupled to the user interface, wherein the controller comprises:
- a memory device; and
- a processor, wherein the processor is configured to execute instructions stored in the memory device, wherein the instructions when executed by the processor cause the processor to cause the agricultural vehicle to join the existing team of agricultural vehicles on the wireless communication network in response to receiving the first signal and create the new team of agricultural vehicles on the wireless communication network in response to receiving the second signal.

17. The control system of claim 16, wherein the instructions when executed cause the processor to pair the agricultural vehicle with another agricultural vehicle in the existing team of agricultural vehicles to facilitate coordination.

18. The control system of claim 16, wherein the instructions when executed cause the processor to cause the agricultural vehicle leave the existing team of agricultural vehicles.

19. The control system of claim 16, wherein the instructions when executed cause the processor to establish the wireless communication network.

20. The control system of claim 16, wherein the instructions when executed cause the processor to identify unavailable vehicles in the wireless communication network to avoid pairing with the unavailable vehicles.

* * * * *